(12) United States Patent
Borde et al.

(10) Patent No.: US 9,913,455 B2
(45) Date of Patent: Mar. 13, 2018

(54) PORTABLE SYSTEM FOR DISPENSING FLUIDS FOR ANIMALS

(71) Applicant: VIRBAC, Carros (FR)

(72) Inventors: Charles Borde, Saint Laurent du Var (FR); Michel Robin, Antibes (FR)

(73) Assignee: VIRBAC, Carros (FR)

( * ) Notice: Subject to any disclaimer, the term of this patent is extended or adjusted under 35 U.S.C. 154(b) by 240 days.

(21) Appl. No.: 14/903,577

(22) PCT Filed: Jul. 16, 2014

(86) PCT No.: PCT/IB2014/063153
§ 371 (c)(1),
(2) Date: Jan. 7, 2016

(87) PCT Pub. No.: WO2015/008237
PCT Pub. Date: Jan. 22, 2015

(65) Prior Publication Data
US 2016/0150762 A1    Jun. 2, 2016

(30) Foreign Application Priority Data

Jul. 19, 2013 (FR) .................................. 13 57148

(51) Int. Cl.
*A01K 13/00* (2006.01)
*A45F 3/04* (2006.01)
*A45F 3/16* (2006.01)

(52) U.S. Cl.
CPC .............. *A01K 13/003* (2013.01); *A45F 3/04* (2013.01); *A45F 2003/166* (2013.01)

(58) Field of Classification Search
CPC ................ A01K 13/003; A01K 27/002; A45F 2003/166
See application file for complete search history.

(56) References Cited

U.S. PATENT DOCUMENTS

| 2004/0000570 A1 | 1/2004 | Forsman |
| 2006/0071006 A1* | 4/2006 | Lojkutz ..................... A45F 3/20 220/705 |
| 2013/0075410 A1 | 3/2013 | Wood |

FOREIGN PATENT DOCUMENTS

| DE | 9 311 999 U1 | 11/1993 |
| WO | 2004/014461 A2 | 2/2004 |
| WO | 2009/105674 A2 | 8/2009 |

OTHER PUBLICATIONS

International Search Report dated Dec. 5, 2014, issued in corresponding International Application No. PCT/IB2014/063153, filed Jul. 16, 2014, 7 pages.

(Continued)

*Primary Examiner* — Monica L Williams
(74) *Attorney, Agent, or Firm* — Christensen O'Connor Johnson Kindness PLLC

(57) ABSTRACT

A portable dispensing device for administering fluids intended for animals comprising a backpack with a main compartment delimited by a rear wall configured to come into contact with the back of the user, an outer wall arranged opposite the rear wall and a side wall linking the rear and outer walls, in addition to a flexible pouch containing the fluid to be administered, placed in said main compartment, in which at least the part of the outer wall of the backpack opposite said pouch is made from a rigid material in order to form a shockproof protection and the pouch is removably secured to the rear wall.

12 Claims, 3 Drawing Sheets

(56) References Cited

OTHER PUBLICATIONS

Figure 2:
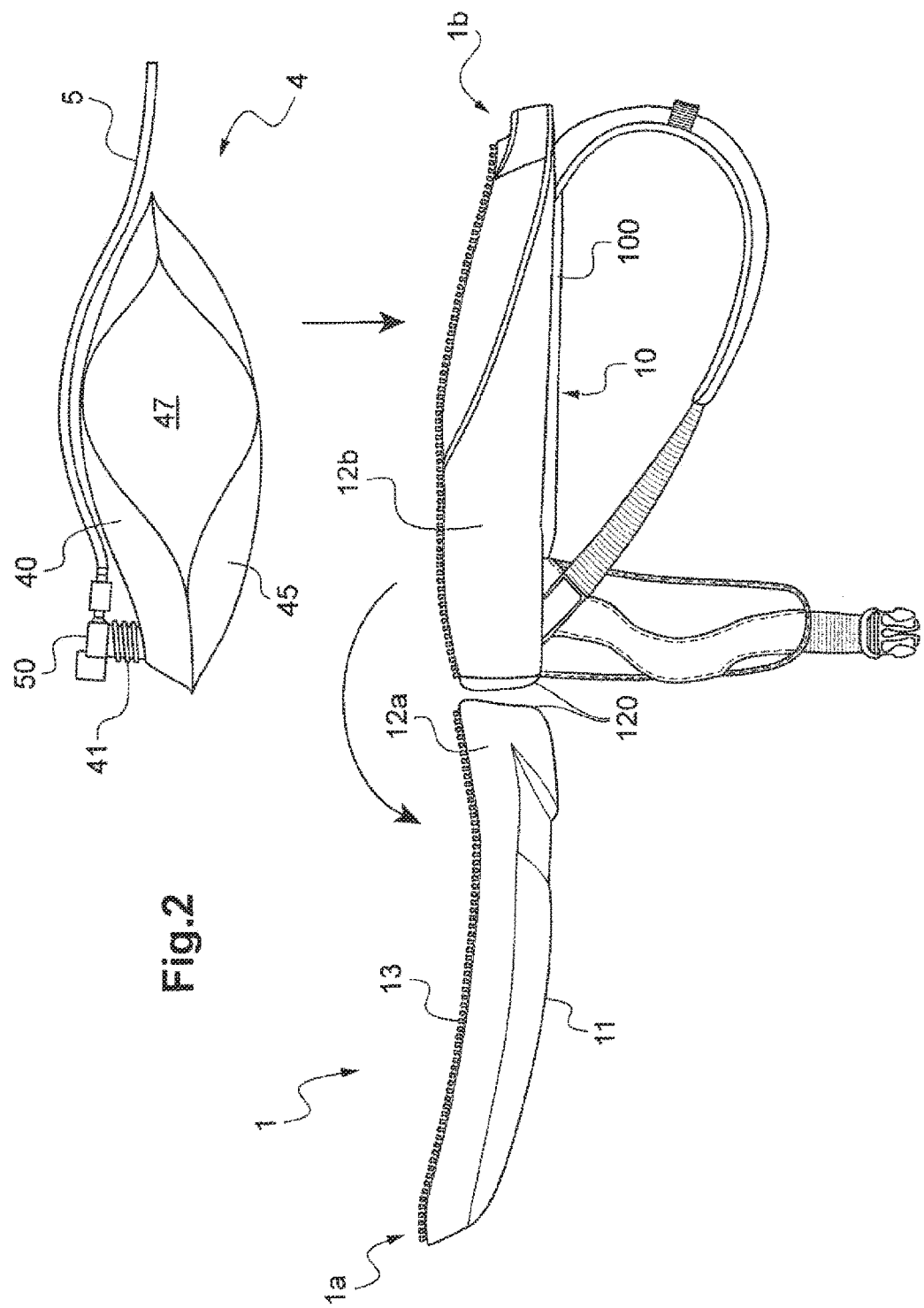

Written Opinion of the International Search Authority dated Dec. 5, 2014, issued in corresponding International Application No. PCT/IB2014/063153, filed Jul. 16, 2014, 5 pages.
Written Opinion of the International Searching Authority dated Dec. 5, 2014, issued in corresponding International Application No. PCT/IB2014/063153, filed Jul. 16, 2014, 6 pages.
International Preliminary Report on Patentability dated Jan. 19, 2016, issued in corresponding International Application No. PCT/IB2014/063153, filed Jul. 16, 2014, 1 page.

* cited by examiner

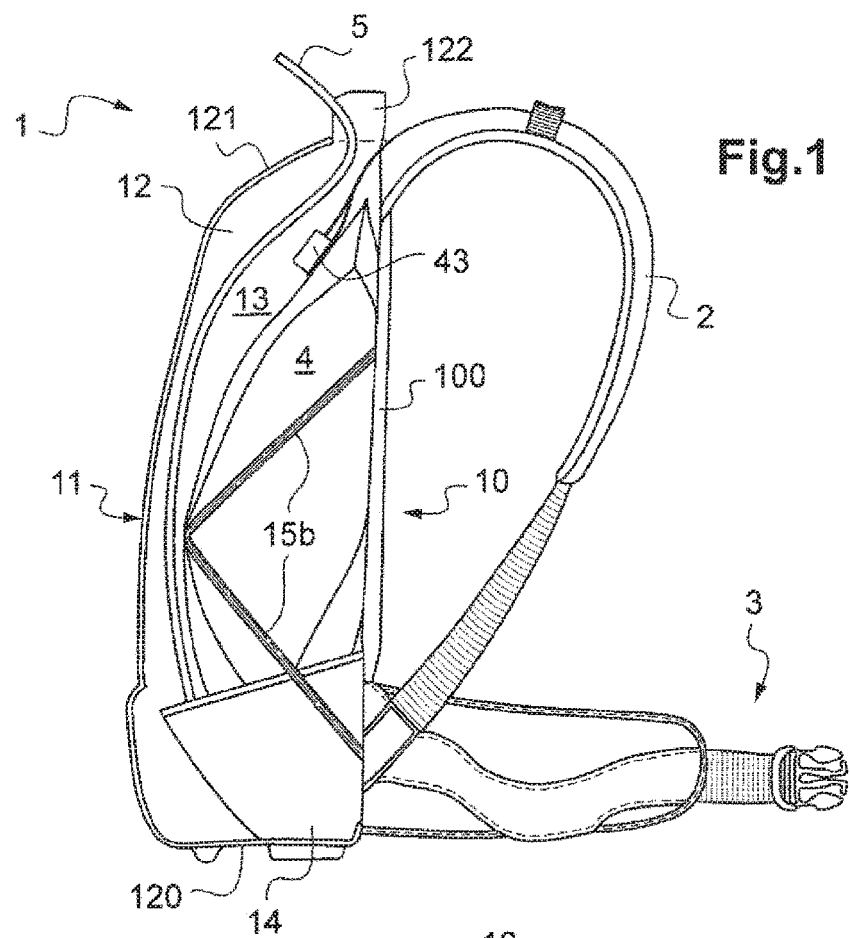
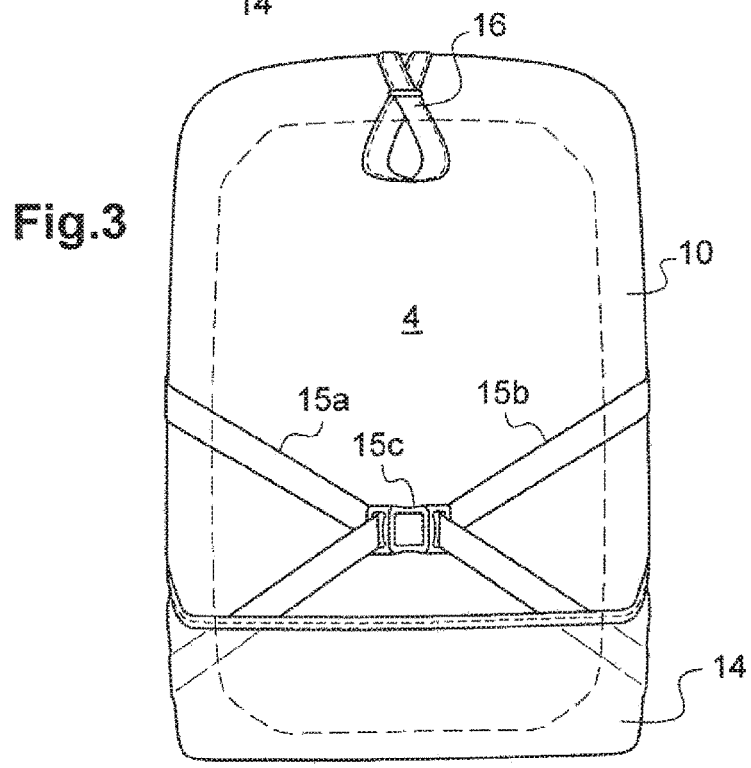

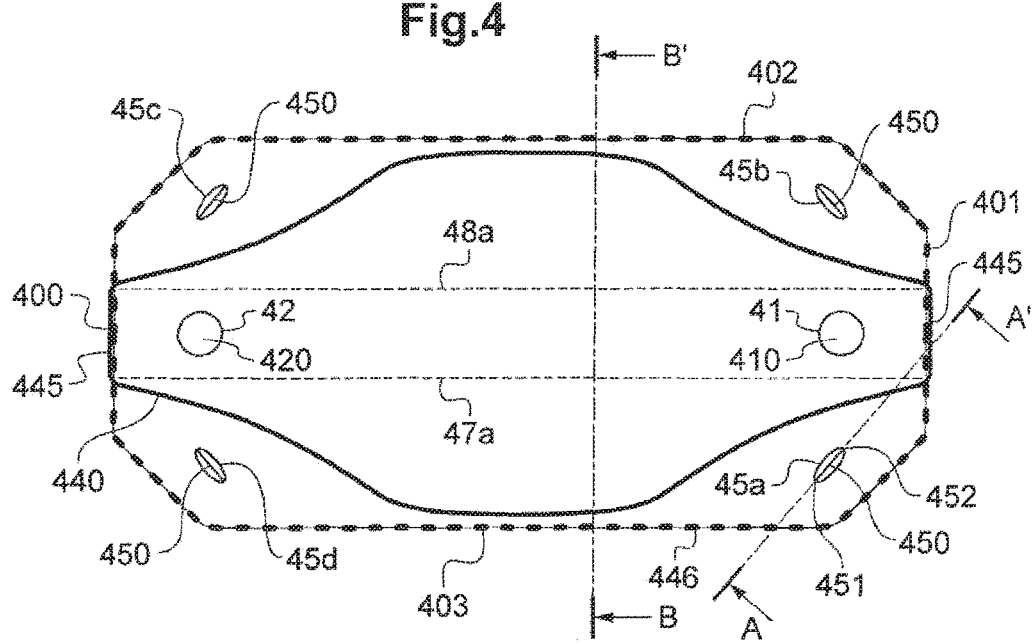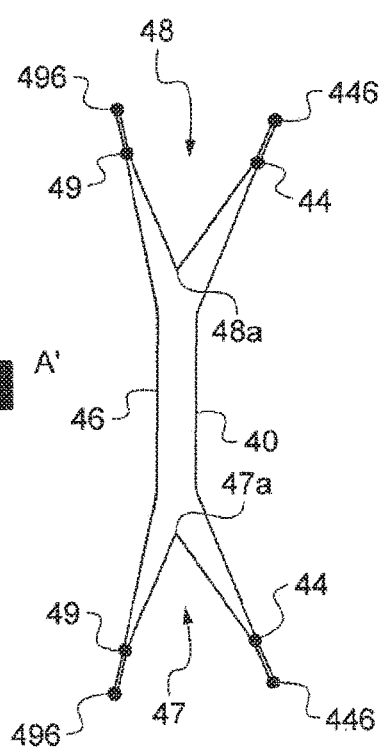

PORTABLE SYSTEM FOR DISPENSING FLUIDS FOR ANIMALS

The present invention relates to a portable dispensing system for administration of fluids intended for animals, in particular for cattle.

These fluids are notably liquid drugs which are directly deposited on the animals, on a line of the back which runs from the shoulders to the rump. This administration route is conventionally called a "pour-on" route.

Many devices of this type have already been proposed.

Thus, rigid flasks are known comprising a portion forming a reservoir and a portion forming an area for measuring the dose of drug to be administered.

They have to be turned upside down for pouring the product on the animal, which causes risks of falling because of poor handling and therefore deterioration of the flask and of the product which it contains.

These flasks allow satisfactory dosage of the drug.

However, they may contain only a limited amount of product, often insufficient for treating in one go a substantial number of animals. Otherwise, their weight would make their handling difficult.

This is why systems have been proposed for making the containers portable.

Thus, a rigid container, such as a canister or a reservoir generally in plastic material, may be hung from a shoulder strap or else on the back of the user by a system of straps which surrounds the container or by positioning the canister in a backpack.

Patent EP-0411858 as for it describes a plastic reservoir including protruding portions forming slots for letting through a belt.

Such a reservoir may therefore be borne by a user by attaching the belt around his/her waist.

For all these devices, placed on the back of the user or around his/her waist, it is necessary to provide a system for delivering the fluids present in the container.

Generally, a flexible supply tube is attached at the dispensing orifice of the reservoir, this tube being itself connected to an applicator gun which is a metering pump.

In order that the whole of the liquid present in the container be dispensed, it is generally provided that the dispensing orifice, which is also the orifice for filling the reservoir, is positioned downwards so that the fluid is discharged by gravity. Turning over the reservoir causes handling operations which may cause leaks of product for example if the attachment of the flexible tube to the dispensing orifice is faulty.

Alternatively, when the dispensing orifice of the reservoir is positioned upwards, a plunger tube connected to the supply tube of the flexible hose is placed inside the container so that the fluid is collected at the lowest portion of the reservoir, otherwise the pump sucks up air and the metering of the drug is endangered.

These devices have the advantage of being able to transport a larger volume of fluids, corresponding to the weight that the operator may bear on his/her shoulders, i.e. volumes which may range up to several liters of drug composition. This is important when the cattle is in the fields since this in particular avoids that the operator often interrupts the treatment of the animals for replacing an empty reservoir and for example loses sight of the animals already treated and those which further have to be treated.

These devices however have many drawbacks.

Indeed, when the user bears the container hung from a shoulder strap, the position for transporting large weights is not comfortable. He/she is thus led to take and lay the container several times during the treatment of the herd. These handling operations may lead to tearing away of the pipe and therefore to risks of contact with the product which may be toxic for the user or for the environment or further to falls.

Further, these rigid plastic containers have significant weight and size, which has a negative impact on the convenience of the application of the drug as well as on their manufacturing and transport cost.

They also generate a large amount of plastic wastes which occupy highly significant volumes.

Finally, poor handling of the straps for hooking up the canisters may cause a fall of the container. This generally leads to dispersion of the drug, because of the failure of the plug or of the container.

The object of the invention is to overcome these drawbacks by proposing a portable dispensing device for administering fluids for animals, the use of which is simple and without any risk and which limits the loss of product as well as the plastic wastes.

Thus, this device includes a backpack with a main compartment delimited by a back wall intended to come into contact with the back of a user, an outer wall laid out oppositely to the back wall and a side wall connecting the back and outer walls, as well as a flexible pouch containing the fluid to be administered, placed in said main compartment, in which at least one portion of the outer wall of the backpack facing said pouch is made in a rigid material in order to form a shockproof protection and the pouch is removably attached to the back wall by at least one attachment means for ensuring the verticality of the pouch in the backpack when the latter is transported on the back of the operator or when it is laid on the ground.

The pouch may be removed and replaced very easily with a new pouch after use and is therefore a consumable element of the device while the bag is a permanent element.

Any flexible bag may be adapted to the system according to the invention such as for example pouches of the Doypack® type which are flexible pouches in three parts, of the front and rear faces with a circular bottom, which folds as a W when the bag is flattened. The same material generally forms the three elements, a flexible plastic material, for which the structure, which may be a simple PEBD but most often a multilayer structure, ensures the rigidity of the package and protection of the contents.

However, preferably, the flexible pouch comprises four parts, of the front and rear faces and two side bellows on each side of the pouch. The same material generally forms the four elements, a flexible plastic material, for which the structure, which may be a simple PEBD but most often a multilayer structure ensures protection of the contents. Such pouches, for which the size of the front and rear faces corresponds to the width and to the height of the backpack, may then be filled with different amounts of fluid as long as the opening of the bellows corresponds to a side extension of the lower pouch to the width of the side wall connecting the back and outer walls of the backpack.

The portion of the outer wall of the backpack facing the pouch is rigid and avoids collapse or flattening of the backpack.

Preferably, the side wall connecting the back and outer walls is also made in a rigid material, in particular in the low portion lying on the ground when the backpack is laid on the ground. Still more preferably, it is the whole of the backpack which is made in a rigid shockproof material.

It is important to ensure the verticality of the removable pouch contained in the backpack in order to avoid upon use that the pouch which empties does not settle on itself, which may contribute to interfering with proper discharge of the residual fluid contained in the pouch. It has been observed that the absence of obstacles to verticality and to the flattening of the pouch is a significant element which guarantees better emptying of the pouch. Also, removable attachment systems are provided on the back wall of the backpack for attaching and maintaining the pouch against the back wall. These attachment systems are straps, scratches, laces, elastics or any equivalent means giving the possibility of maintaining the pouch vertically against the back wall of the backpack and of avoiding that it settles on itself when it empties. Alternatively, provision may be made so that the pouch comprises in its upper portion attachment islets which may be connected to hooks or buttons located facing these islets on the upper portion of the back wall of the backpack.

Preferably, a system of straps is provided on the back wall of the backpack for attachment of the pouch against the back wall.

The pouch comprises at least one orifice delimited by a base, advantageously with a facing insert, i.e. on the front face of the pouch, which facilitates access to this orifice when the pouch is open.

Advantageously, the orifice delimited by the base is located in proximity to the bottom of the backpack. It includes an anti-return valve and a connecting system intended to be connected to a flexible tube for dispensing the fluid.

In a particularly advantageous way, the connecting system is bent at 90° and free to rotate. If necessary, this gives the possibility of storing the flexible tube still connected to the inside of the backpack by winding it without losing any room.

The pouch may also include a second orifice, located opposite the first, in the upper portion of the pouch, this orifice being delimited by a base and closed with a plug, means being provided on the back wall of the backpack for suspending the pouch by cooperation between the plug and/or the base and these means. In a preferred device according to the invention, this second orifice delimited by a base includes a facing insert, i.e. on the front face of the pouch.

This pouch is preferably of the airless type, i.e. it contains a fluid product in vacuo, injected under pressure without injecting any air and which does not allow return of air when the fluid is expelled by the pump. This system is advantageous for guaranteeing good physical and chemical stability of the elements of interest and of the active ingredients contained in the fluid while a same pouch may be used at different moments over a long time period.

Advantageously, the pouch according to the device of the invention contains a product for veterinary use.

Advantageously, the pouch as well as the fluid product which it contains may be sterilized by gamma irradiation, according to pharmaceutical sterilization standards, for example between 15 and 50 kGrays, more particularly between 25 and 45 kGrays. This is particularly useful if the fluid is intended for parenteral administration of a drug for veterinary use.

When the pouch consists of four parts, of front and rear faces with two side bellows on each side of the pouch, it was seen that it is all the more, more fragile since the volume of the fluid contained in the pouch is significant. For example, pouch falling tests have shown that the welds of the parts with each other and the welds at the bases might yield, which exhibits a risk of contamination of the operator and of the environment and of a loss of product if the operator, who replaces an empty pouch with a full pouch in the backpack, drops the pouch. It was seen that the setting into place of connecting points between the internal faces of the bellows, outside the pouch, on the high and low portions of the pouch has the benefit of forming areas of preferential fragility, or areas of preferential failure, in the case of falling, without interfering with the filling of the pouch. Moreover, these connecting points which make the high and low ends of the bellows secure advantageously contribute to the emptying and to the flattening of the pouches by forming a funnel towards the bases in the lower portion of the pouch.

Advantageously, the pouch consisting of four parts includes at least one preferential failure area in the low portion of the pouch which includes a base.

In a particularly preferred way, the preferential failure areas have an oblong shape. The major axis of each of said areas is oriented substantially perpendicularly to a ray passing from the centre of the pouch and intercepting this axis.

In a particularly advantageous way, the pouch consists of four parts and includes at least four preferential failure areas of oblong shape in each corner of the pouch.

Finally, a secondary compartment may be provided in the main compartment at the bottom of the backpack, in which said pouch is placed. This secondary compartment, preferably leak-proof, plays the role of a retention tank in the case when a leak of the fluid contained in the pouch would occur, so that the operator is not dirtied by fluid.

The invention will be better understood and other objects, advantages and features thereof will become more clearly apparent upon reading the description which follows and which is made with reference to the appended drawings, wherein:

FIG. 1 is a side view of a device according to the invention, showing the bag in a sectional view, FIG. 2 is a side view showing both constitutive elements of the device, the backpack being open, FIG. 3 is a front view of the back portion of the backpack illustrating the means for attaching the pouch, FIG. 4 is a planar view of a flexible pouch intended to be attached in the backpack illustrated in FIGS. 1 to 3, FIG. 5 is a sectional view along the line A-A' of FIG. 4 and, FIG. 6 is a sectional view along the line B-B' of FIG. 4.

The elements common to the various Figures will be illustrated with the same references.

FIGS. 1 and 2 show a backpack, 1 this backpack being in a closed position in FIG. 1 and in an open position in FIG. 2.

It includes a back wall 10, an outer wall 11, located opposite to the back wall when the bag is in a closed position, and a peripheral side wall 12 which connects the back and outer walls.

In the example illustrated in FIG. 2, this side wall is made in two portions 12*a* and 12*b* which may be connected together by a zip fastener system 13.

Thus, in this embodiment, it may be considered that the backpack is made in two shells 1*a* and 1*b* connected by a zip fastener.

The side wall defines the bottom 120 of the bag, on which it is intended to rest as well as an upper face 121.

This backpack 1 is provided with straps 2 which are attached on the back wall 10 of the backpack, at the bottom 120 and at the upper face 121 of the bag.

FIG. 1 shows that the backpack also includes elements 3 of a belt, connected to the back wall 10, above the bottom 120.

The end face 121 includes a portion 122 forming a handle for facilitating the handling of the backpack.

The walls 10 to 12 of the bag 1 define a main compartment 13.

FIG. 1 shows that a secondary compartment 14, as a pouch, may be provided on the bottom 120 of the backpack.

In the example illustrated in FIG. 1, a pouch 4 containing the fluid to be administered is placed in the secondary compartment 14.

Preferably, the secondary compartment 14 is fluid-proof. Thus, in the case of an inadvertent flow of fluid from the pouch, the fluid is retained in the secondary compartment, which gives the possibility of protecting the user from contact with the product.

This pouch 4 is attached to the back wall 10 of the backpack by means of straps 15a and 15b. These straps are themselves attached to the back wall of the backpack.

FIG. 3 illustrates the back wall 10 of the backpack, as seen from the main compartment 13.

It shows the straps 15a and 15b which may be connected by a connecting system 15c.

Thus, once the pouch 4 is placed in the secondary compartment 14, the pouch 4 may be attached against the back wall 10, by adjusting both straps 15a and 15b on the pouch and by closing the connecting system 15c.

FIG. 3 also illustrates a means for attaching the pouch illustrated by a strap 16, with the shape of a loop which is attached against the back wall 10, in proximity to the upper face 121 of the backpack.

This strap 16 is preferably made in an elastic material. It is intended to cooperate with a base 42 of the pouch which will be illustrated in more detail with reference to FIG. 4.

This strap 16 contributes to attaching the pouch 4 on the back wall 10. In practice, the pouch 4 is suspended by means of this strap, which allows it to be maintained in a vertical position. The fluid present in the pouch therefore accumulates in the low portion of the pouch, because of gravity.

It should be noted that the strap 16 or the straps 15a and 15b give the possibility of attaching the pouch 4 to the back wall, removably.

This allows replacement of the pouch 4 when it is empty.

FIG. 1 also illustrates a supply pipe 5 which is intended to be connected to a dispensing gun (not illustrated in the figures). The supply pipe 5 leaves the backpack at the upper face 121, in an aperture made at the centre, so that the backpack does not pose any problem of laterality (and is both usable for left-handed persons and right-handed persons). The outlet of the supply pipe at the upper face is involved for limiting the possibilities of tearing off the supply pipe upon using the device, by inadvertently being caught by branches, for example. However, provision may be made for an aperture on the right and/or on the left, for example on the wall 12, it being understood that this aperture should preferentially be located above the secondary compartment 14.

Generally, the walls 10 and 12 of the backpack may be made in a flexible material, for example a textile material. They may also be formed with different materials of different rigidity.

For example it is advantageous to provide a resistant and rigid material for forming the bottom of the bag which will be in contact with the ground when the bag is laid on the ground, on a shelf or in a vehicle.

Further, for improving the comfort of the user, foam portions 100 may for example be provided on the back wall 10, on its face intended to come into contact with the user.

The outer wall 11 of the backpack consists of a material giving it sufficient rigidity so that the bag does not collapse on itself and that it supports aggressions and/or impacts from the outside. The outer wall therefore for example comprises a shell made in a much more rigid material than the textile material which may form the remainder of the bag.

This shell may be made in a synthetic material, for example in a thermoformed or injected plastic material or in another material having similar rigidity characteristics, such as for example stamped iron or aluminium. One will ensure however limitation as far as possible of the weight of the backpack.

This shell is provided at least on the portion of the outer wall 11 which is facing the pouch 4. In this way, the pouch 4 is protected from any impact which may occur on the outer wall 11, such as like horn strokes and the verticality of the pouch is ensured when the backpack is closed.

Of course, the whole of the outer wall 11 may also be made as a rigid shell.

Consequently, the pouch 4 is protected against possible impacts which may occur during the use of the backpack, i.e. when it is placed on the back of a user.

Moreover, provision may also be made for making the whole of the backpack in a rigid material.

This gives the possibility of protecting the pouch 4 against any type of impact, notably those which may occur when the backpack falls on the ground during its handling.

It should also be noted that the pouch 4 is protected against impacts because of its attachment against the back wall of the backpack and its optional positioning in the secondary compartment 14.

Indeed, this attachment limits the movements of the pouch inside the main compartment 13, the backpack then forming a protective cover, absorbing the impacts without transmitting them to the pouch 4.

Reference is now made to FIG. 2 which illustrates the setting into place of a pouch 4 in the backpack 1.

In the exemplary embodiment illustrated in FIG. 2, the backpack consists of two half-shells 1a and 1b which are preferably made in a rigid material.

The opening of the backpack is obtained by actuating the zip fastener 13, which gives the possibility of obtaining a complete opening, the two shells 1a and 1b then being located substantially in the same plane.

The pouch 4 is then placed in the half-shell 1b, against the back wall 10, the straps 15a and 15b being detached from each other.

FIG. 2 shows that the pouch 4 includes a base 41 around an orifice of the pouch.

On this base, is attached a system 50 for connecting to the flexible tube 5.

The pouch 4 is positioned on the back wall 10, so that the base 41 is found in proximity to the bottom 120 of the backpack.

This positioning of the base 41 gives the possibility of ensuring complete emptying of the pouch, even in the absence of a plunger tube. This emptying is all the better ensured since the pouch is of the airless type, i.e. containing a product in vacuo, without return of air upon use.

It should be noted that the application of a vacuum also gives the possibility of improving the preservation of the product while avoiding any oxidation and obtaining flattening of the pouch gradually during the administration of the product.

Moreover, the pouch preferentially consists of a material supporting sterilization by gamma irradiation. In practice, if the fluid product is a sterile drug, the pouch may be sterilized prior to the filling with the liquid product and this filling is then achieved under a sterile environment. Alternatively, the sterilization is achieved on the filled pouch.

Once the pouch 4 is positioned against the back wall, the straps 15a and 15b are connected and attached to each other by means of the connecting system 15c.

The backpack 1 may then be closed and is ready to be used, as soon as the flexible tube is connected to a dispensing gun.

It should be noted that this 180° opening facilitates the setting into place of the pouch, like its withdrawal once it is empty.

Reference is now made to FIG. 4 which illustrates a pouch consisting of four parts, front and rear faces with two side bellows on each side of the pouch, as seen in a plane.

FIG. 4 shows the front face 40 of the pouch 4 which includes the bases 41 and 42. Generally, these bases appear as a cylindrical part welded on the pouch and delimiting an orifice of the pouch.

The front face 40 of the pouch has a substantially rectangular shape. The bases 41 and 42 are located on the central longitudinal axis of the face 40, the base 41 being located in proximity to the first side 401, while the base 42 is located in proximity to the other small side 400. Both bases 41 and 42 are therefore located at two opposite ends of the pouch.

As described with reference to FIG. 2, on the base 41 may be attached a system for connecting to the flexible tube.

Preferably, this base 41 is equipped with an anti-return gasket placed at the orifice 410. Further, an anti-return valve is provided on the connecting system 50.

This gives the possibility of avoiding any contact between the user and the product. This also avoids that air may enter the pouch when the connecting system is disconnected, notably for changing the flexible tube or the gun. Finally, any risk of back-contamination is avoided. Indeed, a product extracted from the pouch and not administered cannot return therein. This therefore avoids deterioration of the product contained in the pouch, which is important in the case of a pharmaceutical product.

The base 42 delimits an orifice 420 which is closed by a plug 43.

The base 42 and the plug 43 give the possibility of suspending the pouch to the back wall 10 of the backpack at an attachment means illustrated in FIG. 3 by the strap 16.

The orifice 420 also allows a standard use of the pouch for example with a nozzle and a volumetric pump. It also allows the achievement of total emptying of the pouch if a problem occurs during its manufacturing, while it is already filled with fluid. An emptying of the pouch may also prove to be useful if the product present in the pouch proves to be unsuitable for a use and if recovery of the pouch is desired with view to reusing it.

FIG. 4 also shows that the portion of the pouch 4 intended to contain the liquid is delimited by welds between the different parts of the pouch. They are schematized by lines 440 and 445.

FIG. 6 more specifically shows the structure of the pouch which comprises, in addition to the front face 40, a rear face 46 and two bellows 47 and 48 connecting the front and rear faces. The folds of the bellows 47a and 48a are illustrated in dotted lines in FIG. 4.

FIG. 6 thus illustrates a welding point 44 between the front face 40 and the bellows, and a welding point 49 between the rear face 46 and the bellows. Thus, the weld (reference 445 in FIG. 5) involves the front face and the rear face at the small sides 400 and 401 and a front or rear face with bellows (references 44 and 49 in FIGS. 5 and 6), on the large sides 402 and 403 of the pouch. FIG. 6 also illustrates the weld 446 at the periphery between the front face 40 and the bellows 47 and 48 and the weld 496 between the rear face 46 and the bellows 47 and 48.

Moreover, between the weld provided between the front/rear face and the bellows and the outer periphery of the pouch where the front face and the rear face are respectively welded to the bellows, are provided at least one preferential weakened or breakage area. They are referenced as 45a to 45d.

These weakened areas have the advantage of ensuring protection of the pouch against impacts.

Indeed, they preferentially absorb the energy caused by the falling of the pouch and break instead of the weld 440 or of the welds binding the bases to the front face.

FIG. 4 shows that these weakened areas have a substantially oblong shape and that the major axis 450 of each area 45a to 45d is substantially perpendicular to rays starting from the centre of the pouch and intercepting this axis.

In the case of the pouch filled with liquid falling down flat, the impact wave propagates from the centre of the pouch in every direction.

Taking into account this layout relative to the major axis of the oblong areas, the impact wave is exerted over the whole length of the oblong areas. This promotes its dispersion and its absorption, which reinforces the effectiveness of these weakened areas.

In practice, a breakage will actually occur at the oblong areas 45a to 45d. However, the main weld 440 and the welds binding the bases to the front face are protected from the impact wave and do not undergo any deterioration. These areas thus form preferential breakage areas.

With reference to FIG. 5, an exemplary embodiment of these weakened areas will now be described.

FIG. 5 shows the weld point 445 between the front 40 and rear 46 faces. The fold of the bellows 48 is materialized by the point 48a. At the point 44 are welded the front face 40 and the bellows 48 and at the point 49 are welded the rear face 46 and the bellows 48. The weld points 446 and 496 materialize the peripheral welds between the front face 40, the rear face 46 and the bellows 48. The space for the fluid is located between the points 44, 49, and 445.

The weakened area 45a is illustrated here by a weld between the points 451 and 452, between both same faces towards the bellows 48. It is also advantageous to remove by cutting them out, for example with a punch, both faces of the bellows 48 located between the points 451 and 452 and to weld, between the points 451 and 452, the front and rear faces 40 and 46.

Thus, each area 45a to 45d may be defined by an oblong weld line, or by a full weld or by adhesive bonding or by any equivalent bonding means at which, either the faces facing the bellows 47 or 48, or the front and rear faces are bound together.

These areas are less resistant than the weld 440 since they do not involve the bellows. During an impact, they break preferentially by absorbing and dissipating the associated energy. Since they do not delimit any space in which the fluid is located, their failure does not cause any leak.

The invention is not limited to this embodiment of the preferential breakage areas.

In the exemplary embodiment illustrated in FIG. 4, the areas 45a to 45d are located on either side of each base 41, 42.

It should also be noted that these areas then deform the pouch when it is full, which participates in proper emptying of the pouch by shrinking the volume around each base.

Thus, these preferential breakage areas participate, with the structure of the backpack, in the protection of the pouch for avoiding any risk of failure in the case of the impact.

Finally, the use of flexible pouches instead and in place of rigid containers gives the possibility of limiting the amount of waste and of reducing the transport cost, because of the obtained reduction of weight and volume.

The device according to the invention is particularly suitable for administering a drug for veterinary use to cattle and may advantageously may be used for this purpose, in particular for an pour-on application on cattle.

The reference sign inserted after the technical features appearing in the claims have the sole purpose of facilitating the understanding of the latter and will not limit the scope thereof.

The invention claimed is:

1. A portable dispensing device for administering fluids intended for animals comprising:
   a backpack with a main compartment delimited by a back wall configured to be in contact with the back of a user, an outer wall laid out oppositely to the back wall and a side wall connecting the back and outer walls; and
   a flexible pouch containing a fluid to be administered, the flexible pouch placed in said main compartment,
   wherein at least the portion of the outer wall of the backpack facing said pouch is made from a rigid material in order to form a shockproof protection and said pouch is removably attached to the back wall with at least one attachment means, wherein the pouch consists of includes four parts, front and rear faces with two side bellows on each side of the pouch and includes at least one preferential breakage area.

2. The device according to claim 1, wherein the whole of the backpack is made from a shockproof rigid material.

3. The device according to claim 1, wherein the at least one attachment means includes a system of straps which is provided on the back wall of the backpack to attach the pouch to the back wall.

4. The device according to claim 1, wherein the pouch comprises an orifice delimited by a base including a connecting system with an anti-return valve and configured to be connected to a flexible tube to dispense the fluid, the orifice being located in proximity to a bottom of the backpack.

5. The device according to claim 1, wherein the pouch includes an orifice located in proximity to a high portion of the backpack, the orifice being delimited by a base and closed by a plug, the at least one attachment means being provided on the back wall of the backpack in order to suspend the pouch by cooperation between the at least one attachment means and one or more of the plug or the base.

6. The device according to claim 1, wherein the pouch contains a product in vacuo.

7. The device according to claim 6, wherein the pouch and the fluid which it contains are sterilized.

8. The device according to claim 1, wherein the pouch contains a drug for veterinary use.

9. The device according to claim 1, wherein said at least one preferential breakage area has an oblong shape a major axis of each of said at least one preferential breakage area is oriented substantially perpendicularly to a ray passing through the center of the pouch and intercepting the major axis.

10. The device according to claim 1, wherein a secondary compartment is provided in the main compartment, at a bottom of the backpack, in which said pouch is placed.

11. A method comprising administering a fluid with the device of claim 1, the fluid comprising a drug.

12. The method according to claim 11, wherein the drug is applied as a pour-on on cattle.

* * * * *